(12) United States Patent
Huang et al.

(10) Patent No.: US 8,335,282 B2
(45) Date of Patent: Dec. 18, 2012

(54) METHOD FOR IMPLEMENTING AN EQUALIZER OF AN OFDM BASEBAND RECEIVER

(75) Inventors: Jian-Wei Huang, Taipei (TW); Jeff Lin, Taipei (TW)

(73) Assignee: Via Technologies Inc., Hsin-Tien, Taipei (TW)

( * ) Notice: Subject to any disclaimer, the term of this patent is extended or adjusted under 35 U.S.C. 154(b) by 909 days.

(21) Appl. No.: 11/278,685

(22) Filed: Apr. 5, 2006

(65) Prior Publication Data

US 2007/0237244 A1    Oct. 11, 2007

(51) Int. Cl.
*H04L 27/08* (2006.01)
*H04L 27/28* (2006.01)
*H04L 5/12* (2006.01)
*H04L 23/02* (2006.01)
*H04B 1/10* (2006.01)

(52) U.S. Cl. .................. 375/341; 375/261; 375/350
(58) Field of Classification Search .............. 375/260, 375/261, 267, 350, 262, 322, 324, 340, 341
See application file for complete search history.

(56) References Cited

U.S. PATENT DOCUMENTS

| 7,065,146 | B1 * | 6/2006 | Lou et al. ............... 375/267 |
| 7,308,033 | B2 * | 12/2007 | Yu et al. ................ 375/260 |
| 2004/0005018 | A1 * | 1/2004 | Zhu et al. .............. 375/340 |
| 2004/0091058 | A1 * | 5/2004 | Tosato et al. .......... 375/261 |
| 2005/0117657 | A1 * | 6/2005 | Chen .................... 375/260 |
| 2007/0058734 | A1 * | 3/2007 | Kao et al. .............. 375/260 |
| 2007/0217536 | A1 * | 9/2007 | Choi .................... 375/262 |

* cited by examiner

*Primary Examiner* — Betsy Deppe
(74) *Attorney, Agent, or Firm* — McClure, Qualey & Rodack, LLP

(57) ABSTRACT

A method for implementing an equalizer of an orthogonal frequency division multiplexing (OFDM) baseband receiver is provided. The OFDM baseband receiver includes a channel estimation and tracking module for estimating a channel impulse response of an input signal of the equalizer. A conjugate of the channel impulse response is first calculated. The input signal and the conjugate of the channel impulse response are then multiplied to generate a product signal. The product signal is then taken as the output signal of the equalizer without dividing the product signal by a channel state information, wherein the channel state information represents a square of an absolute value of the channel impulse response.

15 Claims, 5 Drawing Sheets

METHOD FOR IMPLEMENTING AN EQUALIZER OF AN OFDM BASEBAND RECEIVER

BACKGROUND OF THE INVENTION

1. Field of the Invention

The invention relates to an orthogonal frequency division multiplexing (OFDM) baseband receiver, and more particularly to an equalizer of an OFDM baseband receiver.

2. Description of the Related Art

FIG. 1 is a block diagram of a portion of an OFDM baseband receiver 100. The OFDM baseband receiver 100 includes a fast Fourier transformation (FFT) module 102, a channel estimation and tracking module 104, an equalizer 106, a reciprocal circuit 108, and a demapper 110. When the OFDM baseband receiver 100 receives an OFDM signal, the OFDM signal is sampled and fed to the FFT module 102 to perform a fast Fourier transformation. The signal $S_k$ before the FFT is called a time domain signal, and the signal $Y_k$ after the FFT is called a frequency domain signal. An OFDM signal is transmitted over 52 non-zero subcarriers, and the suffix k indicates the index of the subcarrier. Thus, signal $Y_k$ means the portion of the OFDM signal S transmitted over the k-th subcarrier.

Because signal $Y_k$ is transmitted over multiple subcarriers and suffers from various levels of channel distortion caused by multi-path fading channels, the signal $Y_k$ is delivered to the equalizer 106 to compensate for the channel distortion, otherwise inter-symbol interference (ISI) could damage the signal $Y_k$. The channel estimation and tracking module 104 estimates a channel impulse response $H_k$ of the signal $Y_k$. The channel impulse response $H_k$ represents the channel distortion level of signal $Y_k$. Thus, the equalizer 106 can equalize signal $Y_k$ according to the channel impulse response $H_k$ estimated by the channel estimation and tracking module 104.

Ordinary equalizer 106 equalizes the signal $Y_k$ according to the following algorithm:

$$X_k = \frac{Y_k \times Conj(H_k)}{|H_k|^2};$$

wherein $Y_k$ is the input signal of the equalizer 106, $Conj(H_k)$ is the conjugate of channel impulse response $H_k$ and $|H_k|^2$ which is the square of the absolute value of channel impulse response $H_k$ is referred to a channel state information CSI. According to the algorithm, the equalizer 106 requires the inverse value of $|H_k|^2$ to derive the output signal $X_k$, and the reciprocal circuit 108 is thus created.

Because physically implementing a division for signal processing is difficult, a reciprocal circuit 108 is often implemented with a table which stores multiple exponents and mantissas of the inverse values corresponding to multiple $|H_k|^2$ values. When a $|H_k|^2$ value or a CSI value is calculated, the reciprocal circuit 108 first finds the approximation value closest to the CSI value in the table, and an inverse of the CSI approximation value is then found in the table. Thus, the reciprocal circuit 108 generates an approximation of the inverse of channel state information $|H_k|^2$, or 1/CSI. The 1/CSI value is then delivered to the equalizer 106, and the output signal $X_k$ is generated by the equalizer 106.

The approximation of 1/CSI is not very precise, however, due to the limited number of values stored in the table of the reciprocal circuit 108. When the equalizer 106 uses the approximation to equalize the signal $Y_k$, the error of 1/CSI further induces errors of the output signal $X_k$, and signal distortion results. If the number of values stored in the table of reciprocal circuit 108 is increased to improve the accuracy of 1/CSI, the reciprocal circuit 108 requires greater memory capacity to store the table, and additional hardware cost is incurred. Thus, a method for solving the problem is needed.

BRIEF SUMMARY OF THE INVENTION

A method for implementing an equalizer of an orthogonal frequency division multiplexing (OFDM) baseband receiver is provided. The OFDM baseband receiver includes a channel estimation and tracking module for estimating a channel impulse response of an input signal of the equalizer. A conjugate of the channel impulse response is first calculated. The input signal and the conjugate of the channel impulse response are then multiplied to generate a product signal. The product signal is then taken as the output signal of the equalizer without dividing the product signal by a channel state information, wherein the channel state information represents a square of an absolute value of the channel impulse response.

The invention also provides an OFDM baseband receiver. The OFDM baseband receiver comprises a channel estimation and tracking module for estimating a channel impulse response of an input signal and calculating a conjugate of the channel impulse response, and an equalizer coupled to the channel estimation module for multiplying the input signal and the conjugate of the channel impulse response to generate an output signal, and directly outputting the output signal without dividing the output signal by a channel state information, wherein the channel state information represents a square of an absolute value of the channel impulse response.

The invention also provides a maximal ratio combining (MRC)-OFDM baseband receiver. The MRC-OFDM baseband receiver receives an OFDM signal with a plurality of spatially correlated antennas to generate a plurality of input signals. The MRC-OFDM baseband receiver comprises a channel estimation and tracking module for estimating a plurality of channel impulse responses of the actual channel and calculating the conjugates of the channel impulse responses, and an equalizer coupled to the channel estimation module for respectively multiplying the input signals and the conjugates of the channel impulse responses to generate a plurality of product signals, adding the product signals to generate an output signal, and directly outputting the output signal without dividing it by a channel state information. The channel state information represents the sum of the squares of the absolute values of the channel impulse responses.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
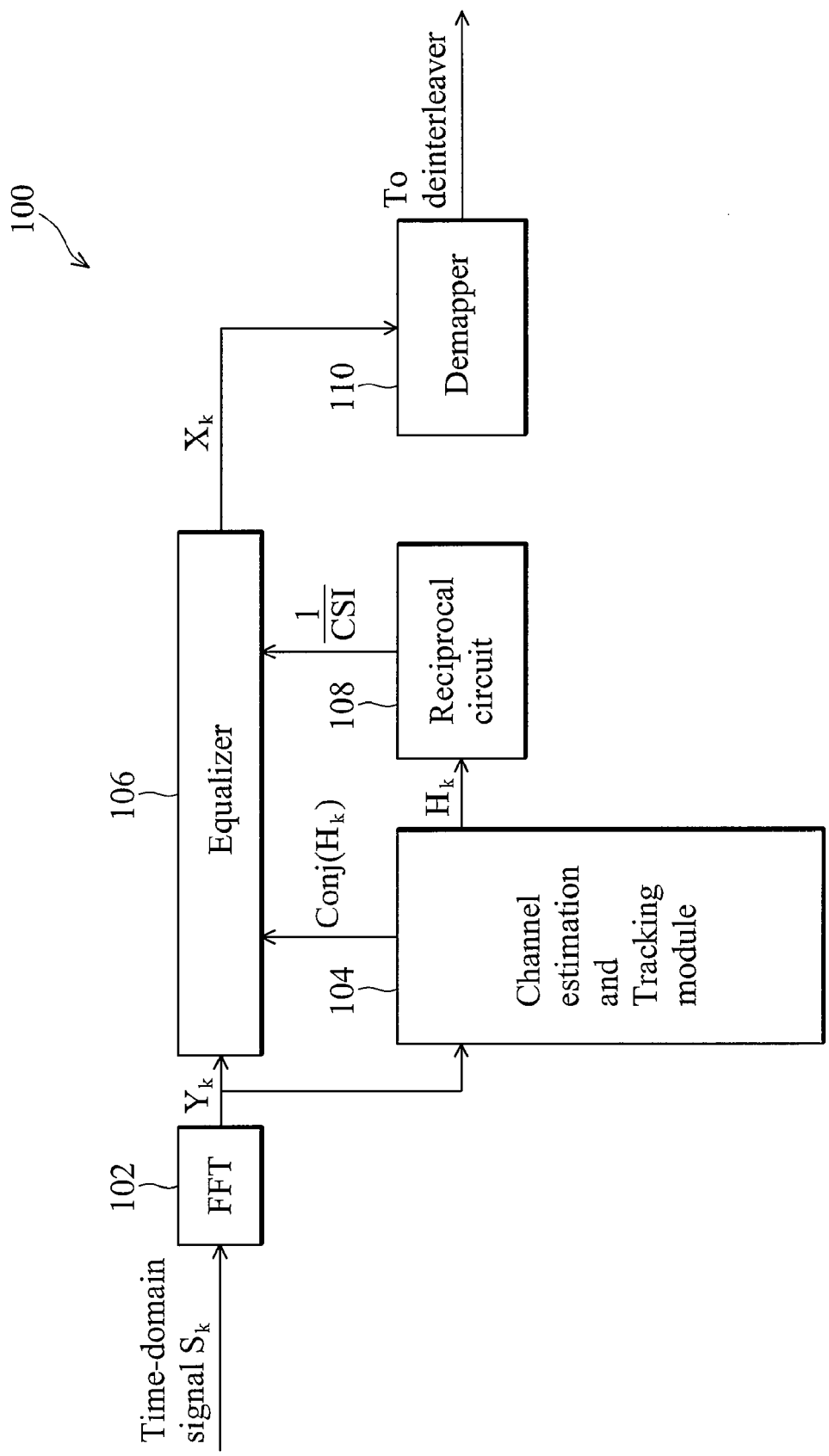
FIG. 1 is a block diagram of a portion of an OFDM baseband receiver.
Figure 2:
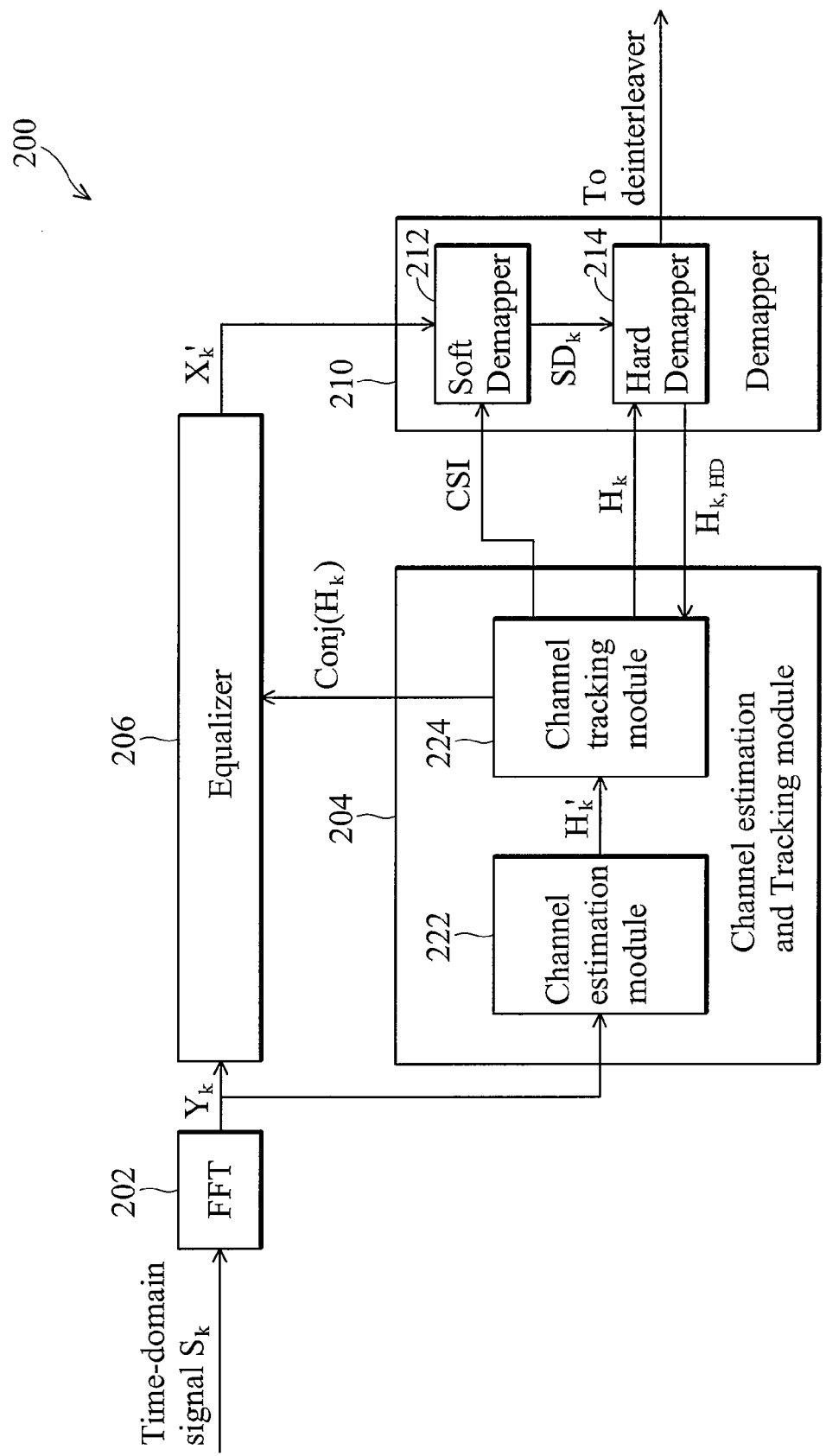
FIG. 2 is a block diagram of a portion of an OFDM baseband receiver according to the invention.

FIG. 2 is a block diagram of a portion of an OFDM baseband receiver 200 according to the invention. The OFDM baseband receiver 200 is roughly similar to the OFDM baseband receiver 100 and includes a fast Fourier transformation (FFT) module 202, a channel estimation and tracking module 204, an equalizer 206, and a demapper 210. However, the reciprocal circuit 108 does not exist in the OFDM baseband receiver 200, and some modules of OFDM baseband receiver 200 require modification to suit this difference. For example, the equalizer 206 and demapper 210 are correspondingly amended.

Basically, the function of the FFT module 202 is identical to that of the FFT module 102. When the OFDM baseband receiver 200 receives an OFDM signal, the OFDM signal is sampled and fed to the FFT module 202 to perform a fast Fourier transformation. After processed with FFT, signal $Y_k$ is then delivered to the equalizer 206 to compensate for the channel distortion.

The channel estimation and tracking module 204 is used to estimate a channel impulse response $H_k$ of the signal $Y_k$. The channel estimation and tracking module 204 includes a channel estimation module 222 and a channel tracking module 224. The channel estimation module 222 estimates the channel impulse response $H_k'$ of the input signal $Y_k$ according to a preamble of the input signal $Y_k$. Because the transmission of the signal $Y_k$ is continued, and the channel impulse response of the other part of the signal $Y_k$ may be different from the channel impulse response $H_k'$ of the preamble of the signal $Y_k$, the channel tracking module 224 is added to refine the channel impulse response of the signal $Y_k$ according to a channel tracking algorithm, wherein the channel tracking algorithm could be, for example, a RLS (recursive least square) tracking algorithm or a LMS (least mean square) tracking algorithm. The channel tracking module 224 receives an estimate $H_{k,HD}$ generated by the demapper 210 to refine the channel impulse response $H_k'$ estimated by channel estimation module 222. A refined channel impulse response $H_k$ is then generated by the channel tracking module 224 for the equalizer 206 to equalize the signal $Y_k$. Additionally, the channel tracking module 224 also calculates the conjugate of channel impulse response $H_k$ and a channel state information CSI. The CSI value, $|H_k|^2$, is a square of the absolute value of the channel impulse response $H_k$.

The function of the equalizer 206 is different from that of the equalizer 106. Because the OFDM baseband receiver 200 does not include a reciprocal circuit, the equalizer 206 multiplies the input signal $Y_k$ and the conjugate of the channel impulse response $H_k$ to generate a product signal $Y_k \times \text{Conj}(H_k)$, and outputting the product signal directly without dividing the product signal by CSI. In other words, the equalizer 206 equalizes the input signal $Y_k$ according to the following algorithm:

$$X_k' = Y_k \times \text{conj}(H_k);$$

wherein $X_k'$ represents the output signal of the equalizer 206, $Y_k$ represents the input signal of the equalizer 206, $H_k$ represents the channel impulse response estimated by the channel estimation and tracking module 204, conj( ) is a conjugate function, and the suffix k represents the index of OFDM subcarrier. Thus, the output signal $X_k'$ of the equalizer 206 is CSI times larger than the output signal $X_k$ of the ordinary equalizer 106 if CSI is larger than 1. That is to say, the output signal $X_k'$ of the equalizer 206 differs from the output signal $X_k$ of the ordinary equalizer 106 by a multiplication factor of CSI.

The demapper 210 demodulates the output signal $X_k'$ of the equalizer 206. Because an OFDM signal is mapped from one of multiple constellation points in a constellation according to the data content of the OFDM signal before it is transmitted, the OFDM baseband receiver 200 must recover the data content of the OFDM signal with the demapper 210 before it is further processed. Different modulation techniques has different constellation mapping. Ordinary modulation techniques used in OFDM systems are BPSK, QPSK, 16-QAM, and 64-QAM. The function of the demapper 210 will be detailed in the following paragraphs with an explanatory constellation mapping of 16-QAM modulation.

Figure 3A:
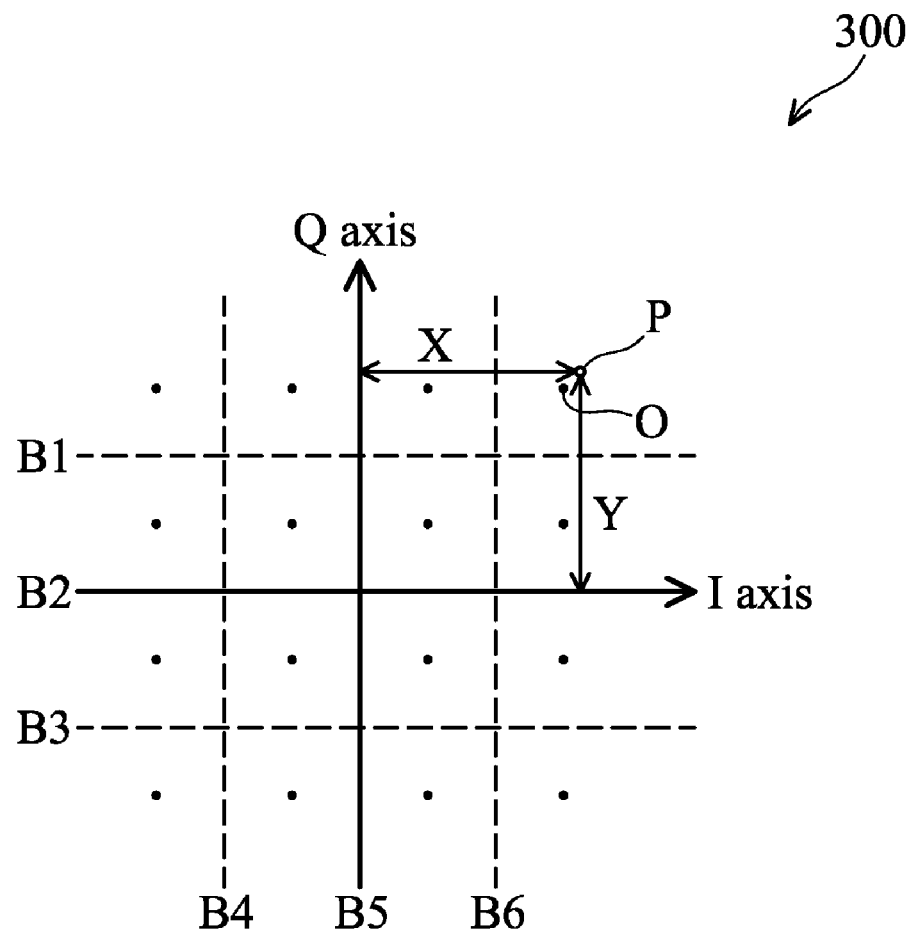
FIG. 3a is an explanatory constellation mapping of an ordinary demapper when 16-QAM is used as modulation technique.

FIG. 3a is an explanatory constellation mapping 300 of an ordinary demapper 110 when 16-QAM is used as modulation technique. The 16-QAM modulation technique transforms every 4-bit data block of the OFDM signal to one of 16 constellation points. Each constellation point is a vector with different amplitude and phase. Thus, when a demapper 110 demodulates a signal $X_k$, the demapper 110 must find the constellation point closest to the signal $X_k$ in the constellation 300. For example, if the signal $X_k$ has an in-phase component X and a quadrature component Y, it can be marked in the constellation 300 as the point P, and the constellation point closest to the point P is the constellation point O. A method for finding the constellation point O closest to the point P is drawing a few decision boundaries B1~B6 to delimit the constellation points in the constellation 300. When the signal $X_k$ falls into the region which represents the constellation point O and is delimited by the decision boundaries B6 and B1, the vector X+iY of the constellation point O is considered as the actual value of the signal $X_k$, and the four bit data represented by the constellation point O is the demodulated data of the signal $X_k$.

Figure 3B:
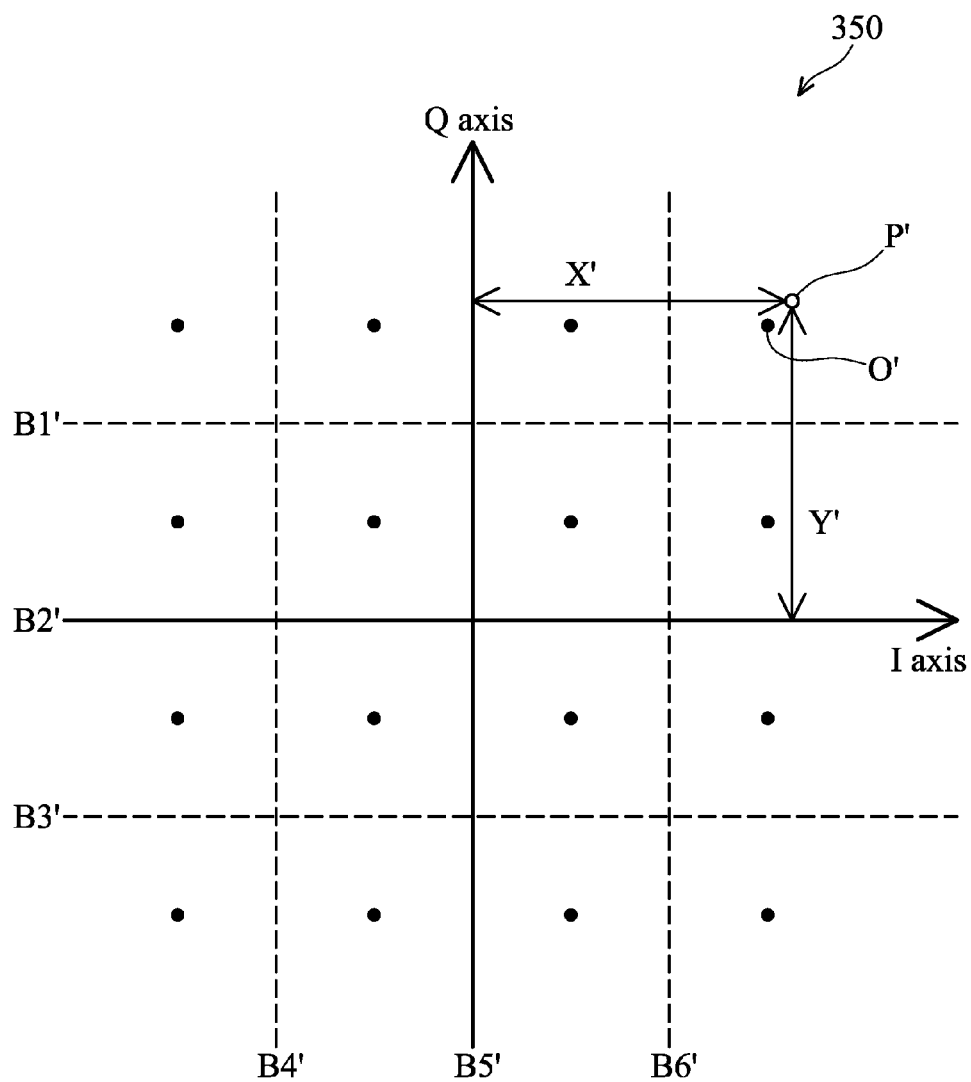
FIG. 3b is an explanatory constellation mapping of the demapper according to the invention when 16-QAM is used as modulation technique.

However, because the signal $X_k'$ outputted from the equalizer 206 differs from the signal $X_k$ of the ordinary equalizer 106 by a multiplication factor CSI, the demapper 210 of OFDM baseband receiver 200 requires corresponding adjustment. FIG. 3b shows an explanatory constellation mapping 350 of the demapper 210 according to the invention when 16-QAM is used as modulation technique. If the signal $X_k$ has an in-phase component X and a quadrature component Y, the corresponding signal $X_k'$ has an in-phase component X' which equals X×CSI and a quadrature component Y' which equals Y×CSI. Thus, the signal $X_k'$ of the equalizer 206 can be marked in the constellation 350 as the point P', which is different from the point P of FIG. 3a. If the demapper 210 wants to demap the signal $X_k'$ to an accurate 4-bit data block, the distances between each constellation point of the constellation 350 and the origin point (i.e. the amplitudes of the constellation points in the constellation 350) also requires adjustment according to the multiplication factor CSI generated by the channel estimation and tracking module 204, as shown in FIG. 3b. This can be achieved by adjusting the locations of the decision boundaries B1'~B6' of the constellation 350 according to the multiplication factor CSI, as shown in FIG. 3b. Thus, the demapper 210 can accurately find the constellation point O' nearest to the point P' according to the decision boundaries B1'-B6' and then obtains the 4-bit value represented by the constellation point O' to demodulate the signal $X_k'$.

FIG. 3a and FIG. 3b only show the concept of demodulation process of the demappers 110 and 210. Practically, the demapper 210 only calculates some functions of the channel state information and the signal $X_k'$ to demodulate the signal $X_k'$. The demapper 210 includes a soft demapper 212 and a hard demapper 214. The soft demapper 212 first adjusts the locations of the decision boundaries B1'~B6' according to the multiplication factor CSI as described. A few boundary values representing the location of the decision boundaries can then be determined. The soft demapper then calculates a few soft decision values $SD_k$ according to the signal $X_k'$ and the boundary values, wherein the soft decision values $SD_k$ represent the distance between the point P' and the decision boundaries B1'~B6'. The hard demapper 214 can then determine the constellation point O' according to the signs of soft decision values $SD_k$, and obtains the demodulated 4-bit data represented by the constellation point O'. The demodulated data is delivered to a deinterleaver for further processing. Because the vector of the constellation point O' is decided as the actual value of signal $X_k$, it can be used to derive an estimate of channel impulse response $H_{k,HD}$, and the estimate of channel impulse response $H_{k,HD}$ is fed back to channel estimation and tracking module 204 to adjust the estimation of channel impulse response $H_k$.

Figure 4:
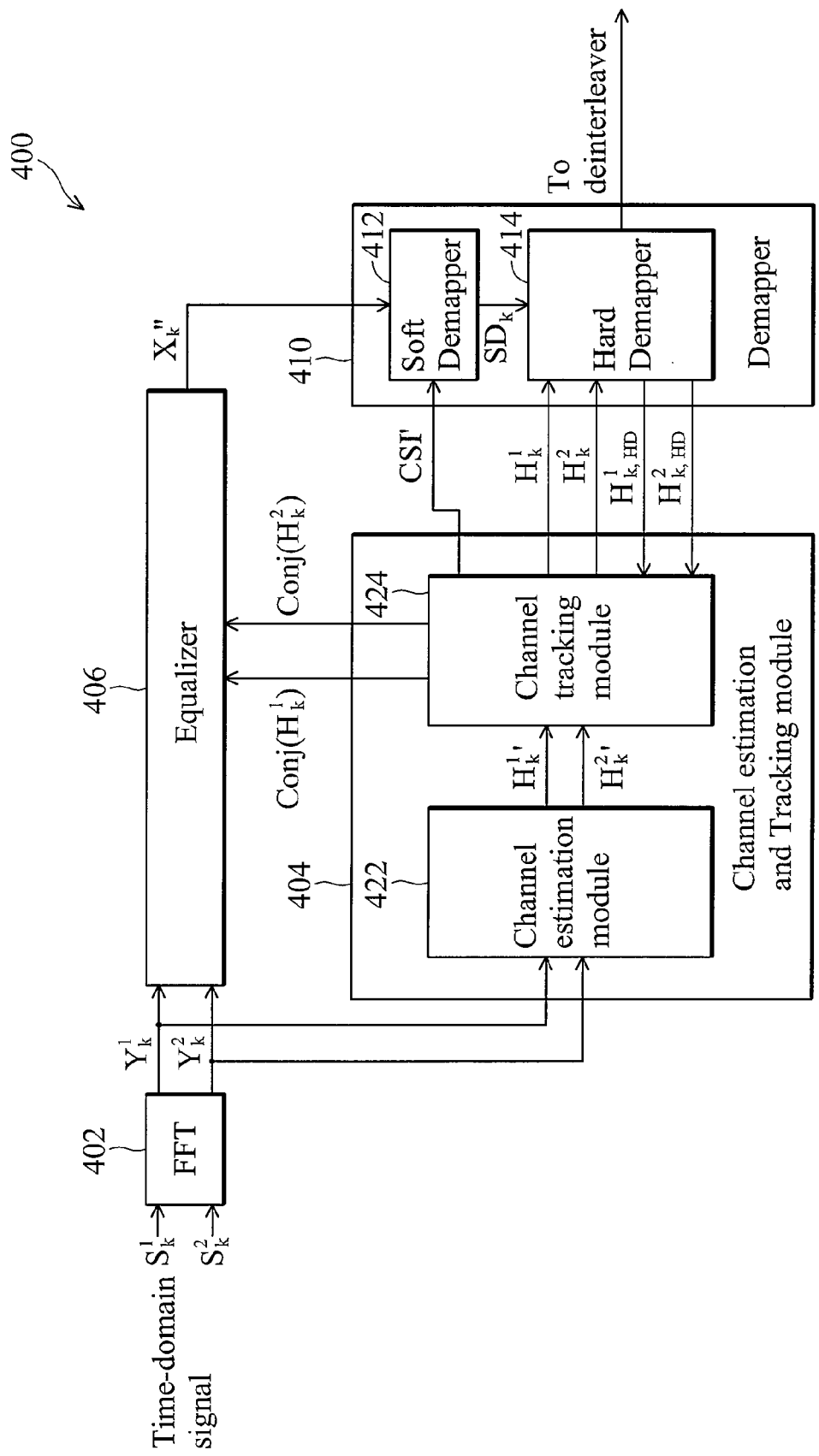
FIG. 4 is a block diagram of a portion of a MRC-OFDM baseband receiver according to the invention.

FIG. 4 is a block diagram of a portion of a maximal ratio combining (MRC)-OFDM baseband receiver 400 according to the invention. The MRC-OFDM baseband receiver 400 is roughly similar to the OFDM baseband receiver 200. However, the OFDM baseband receiver 400 has multiple spatially correlated antennas to receive an OFDM signal, and the multiple antennas generate multiple received signals. Because the signals received by different antennas have been transmitted through different paths before reception, the path gains of signals fade independently. If the multiple received signals are combined to generate a single signal, the distortion of the combined signal is reduced. Accordingly, the MRC-OFDM baseband receiver 400 does not have a reciprocal circuit for calculating the inverse of channel state information.

The MRC-OFDM baseband receiver 400 includes a FFT module 402, a channel estimation and tracking module 404, an equalizer 406, and a demapper 410. Although there are only two input signals $S_k^1$ and $S_k^2$ in FIG. 4, there can be arbitrary number of input signals in the MRC-OFDM baseband receiver 400, and the two input signals $S_k^1$ and $S_k^2$ are only explanatory.

The two input signals $S_k^1$ and $S_k^2$ are subject to a FFT module 402 to generate the two frequency domain signals $Y_k^1$ and $Y_k^2$. The channel estimation and tracking module 404 is then used to estimate the channel impulse response $H_k^1$ and $H_k^2$ of the signals $Y_k^1$ and $Y_k^2$. The channel estimation module 422 estimates the channel impulse responses $H_k^{1'}$, and $H_k^{2'}$ of the input signals $Y_k^1$ and $Y_k^2$ according to the preambles of the input signals $Y_k^1$ and $Y_k^2$. The channel tracking module 424 refines the channel impulse response of the signal s $Y_k^1$ and $Y_k^2$ according to a channel tracking algorithm, wherein the channel tracking algorithm could be, for example, a RLS (recursive least square) tracking algorithm or a LMS (least mean square) tracking algorithm. The channel tracking module 424 receives $H_{k,HD}^1$ and $H_{k,HD}^2$ generated by the demapper 410 to refine the channel impulse response $H_k^{1'}$, and $H_k^{2'}$, estimated by channel estimation module 422 and generate the channel impulse response $H_k^1$ and $H_k^2$. The channel tracking module 424 additionally calculates the conjugates $Conj(H_k^1)$ and $Conj(H_k^2)$ and a channel state information CSI'. The CSI' value, $|H_k^1|^2+|H_k^2|^2$, is a summation of the squares of the absolute values of the channel impulse responses $H_k^1$ and $H_k^2$.

The function of the equalizer 406 is different from that of the equalizer 206. The equalizer 406 respectively multiplies the input signals $Y_k^1$ and $Y_k^2$ and the conjugates of the channel impulse responses $Conj(H_k^1)$ and $Conj(H_k^2)$ to generate multiple product signals $Y_k^1 \times Conj(H_k^1)$ and $Y_k^2 \times Conj(H_k^2)$. Because there is no reciprocal circuit in the MRC-OFDM baseband receiver 400, the product signals are then added to generate an output signal $X_k''$ which is directly outputted by the equalizer 406 without being divided by the channel state information CSI'. In other words, the equalizer 406 equalizes the multiple input signals $Y_k^1 \sim Y_k^n$ according to the following algorithm:

$$X_k = Y_k^1 \times conj(H_k^1) + Y_k^2 \times conj(H_k^2) + \ldots + Y_k^1 \times conj(H_k^1) + \ldots + Y_k^n \times conj(H_k^n);$$

wherein $X_k$ represents the output signal of the equalizer, $Y_k^i$ represents the input signal of the equalizer, $H_k^i$ represents the channel impulse response estimated by the channel estimation and tracking module, conj( ) is a conjugate function, the suffix k represents the index of OFDM subcarrier, i represent the index among the multiple input signals, and n is the number of the input signals or "2" in the example of MRC-OFDM baseband receiver 400.

The demapper 410 is roughly similar to the demapper 210 of FIG. 2. Because the output signal $X_k''$ of the equalizer 406 differs from the ordinary output signal of the ordinary equalizer by a multiplication factor CSI', the constellation mapping process of the demapper 410 requires correspondingly adjustment, as described in FIG. 3b. The demapper 410 first adjusts the distances between each constellation points of the constellation 350 and the origin point (i.e. the amplitudes of the constellation points in the constellation 350) in the constellation 350 according to the multiplication factor of the channel state information CSI'. The constellation point O' which is the most approximate to the output signal $X_k''$ in the constellation 350 is then found, and the data represented by the constellation point O' is then determined. Thus, the output signal $X_k''$ is demodulated, and the data represented by the constellation point O' is delivered to a deinterleaver.

In reality, the demapper 410 only calculates some functions of the channel state information and the signal $X_k''$ to demodulate the signal $X_k''$. The demapper 410 includes a soft demapper 412 and a hard demapper 414. The soft demapper 412 first adjusts the locations of the decision boundaries B1'~B6' in the constellation 350 of FIG. 3b according to the multiplication factor CSI'. A few boundary values representing the location of the decision boundaries can then be determined. The soft demapper 412 then calculates a few soft decision values $SD_k$ according to signal $X_k''$ and the boundary values, wherein the soft decision values $SD_k$ represent the distances between the point P' and the decision boundaries B1'~B6'. The hard demapper 414 can then determine the constellation point O' according to the signs of soft decision values $SD_k$, and obtains the demodulated data represented by the constellation point O'. The demodulated data is delivered to a deinterleaver for further processing. Because the vector of the constellation point O' is decided to be the actual value of signal $X_k''$, it can be used to derive the estimates $H_{k,HD}^1$ and $H_{k,HD}^2$ of the channel impulse responses $H_k^1$ and $H_k^2$, and the estimates $H_{k,HD}^1$ and $H_{k,HD}^2$ are fed back to the channel estimation and tracking module 404 to adjust the estimation of the channel impulse responses $H_k^1$ and $H_k^2$.

The invention provides a method for implementing an equalizer of an OFDM baseband receiver without a reciprocal circuit. The output signal of the equalizer is not divided by a channel state information. Because the output signal of the equalizer is not multiplied by the inverse of the channel state information, the error induced from the inaccuracy of the inverse of the channel state information does not exist in the output signal of the equalizer, and the performance of the OFDM baseband receiver is improved. Additionally, because no reciprocal circuit is needed, the hardware cost for implementing the reciprocal circuit is saved.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for implementing an orthogonal frequency division multiplexing (OFDM) baseband receiver, wherein the OFDM baseband receiver includes a channel estimation and tracking module for estimating a channel impulse response of an input signal of the equalizer, an equalizer, and a demapper, the method comprising:
   via the equalizer, multiplying the input signal and a conjugate of the channel impulse response to generate an output signal of the equalizer;
   via the demapper, deriving a plurality of adjusted decision boundaries from a plurality of decision boundaries in a constellation multiplied by a channel state information, and delimiting a plurality of amplitude-adjusted constellation points by the plurality of adjusted decision boundaries in the constellation, wherein the channel state information represents a square of an absolute value of the channel impulse response;
   via the demapper, calculating a plurality of soft decision values according to the plurality of adjusted decision boundaries and the output signal of the equalizer; and
   via the demapper, finding a first constellation point which is the most approximate to the output signal of the equalizer from the plurality of amplitude-adjusted constellation points in the constellation according to the signs of soft decision values, and demodulating the output signal of the equalizer.

2. The method as claimed in claim 1, further comprising:
   via the demapper, calculating a hard decision estimate of the channel impulse response according to the first constellation point of the output signal of the equalizer; and
   via the demapper, feeding back the hard decision estimate to the channel estimation and tracking module to adjust a subsequent signal portion of the channel impulse response according to the hard decision estimate.

3. The method as claimed in claim 1, wherein the output signal of the equalizer is generated according to the following algorithm:

$$X_k = Y_k \times \text{conj}(H_k);$$

wherein $X_k$ represents the output signal, $Y_k$ represents the input signal of the equalizer, $H_k$ represents the channel impulse response estimated by the channel estimation and tracking module, conj( ) is a conjugate function, and the suffix k represents the index of OFDM subcarrier.

4. The method as claimed in claim 1, wherein the method further comprises:
   via the channel estimation and tracking module, estimating a channel impulse response estimate of the input signal with a preamble of the input signal; and
   via the channel estimation and tracking module, refining the channel impulse response estimate of the input signal according to a channel tracking algorithm to obtain the channel impulse response.

5. The method as claimed in claim 4, wherein the channel tracking algorithm is an algorithm selected from the group comprising a recursive least square tracking algorithm and a least mean square tracking algorithm.

6. An orthogonal frequency division multiplexing (OFDM) baseband receiver, comprising:
   a channel estimation and tracking module, for estimating a channel impulse response of an input signal;
   an equalizer, coupled to the channel estimation and tracking module, for multiplying the input signal and a conjugate of the channel impulse response to generate an output signal of the equalizer;
   a soft demapper, coupled to the equalizer and the channel estimation and tracking module, for deriving a plurality of adjusted decision boundaries from a plurality of decision boundaries in a constellation multiplied by a channel state information, and calculating a plurality of soft decision values according to the plurality of adjusted decision boundaries and the output signal of the equalizer; and
   a hard demapper, coupled to the soft demapper, for finding a first constellation point which is the most approximate to the output signal of the equalizer from a plurality of amplitude-adjusted constellation points in the constellation according to the signs of the soft decision values, and demodulating the output signal of the equalizer,
   wherein the plurality of amplitude-adjusted constellation points are delimited by the plurality of adjusted decision boundaries in the constellation,
   wherein the channel state information represents a square of an absolute value of the channel impulse response.

7. The OFDM baseband receiver as claimed in claim 6, wherein the hard demapper calculates a hard decision estimate of the channel impulse response, and feedbacks the hard decision estimate of the channel impulse response to the channel estimation and tracking module to adjust a subsequent signal portion of the channel impulse response.

8. The OFDM baseband receiver as claimed in claim 6, wherein the equalizer equalizes the input signal according to the following algorithm:

$$X_k = Y_k \times \text{conj}(H_k);$$

wherein $X_k$ represents the output signal of the equalizer of the equalizer, $Y_k$ represents the input signal of the equalizer, $H_k$ represents the channel impulse response estimated by the channel estimation and tracking module, conj( ) is a conjugate function, and the suffix k represents the index of OFDM subcarrier.

9. The OFDM baseband receiver as claimed in claim 6, wherein the channel estimation and tracking module further comprises:
   a channel estimation module, for estimating a channel impulse response estimate of the input signal with a preamble of the input signal; and
   a channel tracking module, coupled to the channel estimation module and the equalizer, for refining the channel impulse response estimate of the input signal according to a channel tracking algorithm to obtain the channel impulse response.

10. The OFDM baseband receiver as claimed in claim 9, wherein the channel tracking algorithm is an algorithm selected from the group comprising a recursive least square tracking algorithm and a least mean square tracking algorithm.

11. An maximal ratio combining (MRC)—orthogonal frequency division multiplexing (OFDM) baseband receiver, wherein the MRC-OFDM baseband receiver receives an OFDM signal with a plurality of spatially correlated antennas to generate a plurality of input signals, the MRC-OFDM baseband receiver comprising:
- a channel estimation and tracking module, for estimating a plurality of channel impulse responses of the plurality of input signals;
- an equalizer, coupled to the channel estimation and tracking module, for respectively multiplying the input signals and a plurality of conjugates of the channel impulse responses to generate a plurality of product signals, and summing the product signals together to generate an output signal of the equalizer;
- a soft demapper, coupled to the equalizer and the channel estimation and tracking module, for deriving a plurality of adjusted decision boundaries from a plurality of decision boundaries in a constellation multiplied by a channel state information, and calculating a plurality of soft decision values according to the plurality of adjusted decision boundaries and the output signal of the equalizer; and
- a hard demapper, coupled to the soft demapper, for finding a first constellation point which is the most approximate to the output signal of the equalizer from a plurality of amplitude-adjusted constellation points in the constellation according to the signs of the soft decision values, and demodulating the output signal of the equalizer,
- wherein the plurality of amplitude-adjusted constellation points are delimited by the plurality of adjusted decision boundaries in the constellation,
- wherein the channel state information represents a summation of squares of absolute values of the plurality of channel impulse responses.

12. The MRC-OFDM baseband receiver as claimed in claim 11, wherein the hard demapper calculates a plurality of hard decision estimates of the channel impulse responses, and feedbacks the hard decision estimates of the channel impulse responses to the channel estimation and tracking module to adjust a subsequent signal portion of the channel impulse responses.

13. The MRC-OFDM baseband receiver as claimed in claim 11, wherein the equalizer equalizes the input signal according to the following algorithm:

$$X_k = Y_k^1 \times \text{conj}(H_k^1) + Y_k^2 \times \text{conj}(H_k^2) + \ldots + Y_k^i \times \text{conj}(H_k^i) + \ldots + Y_k^n \times \text{conj}(H_k^n);$$

wherein $X_k$ represents the output signal of the equalizer, $Y_k^i$ represents the input signal of the equalizer, $H_k^i$ represents the channel impulse response estimated by the channel estimation and tracking module, conj( ) is a conjugate function, the suffix k represents the index of OFDM subcarrier, i represent the index among the plurality of input signals, and n is the number of the input signals.

14. The MRC-OFDM baseband receiver as claimed in claim 11, wherein the channel estimation and tracking module further comprises:
- a channel estimation module, for estimating a plurality of channel impulse-response estimates of the input signals with a plurality of preambles of the input signals; and
- a channel tracking module, coupled to the channel estimation module and the equalizer, for refining the plurality of channel impulse response estimates of the input signals according to a channel tracking algorithm to obtain the plurality of channel impulse responses.

15. The MRC-OFDM baseband receiver as claimed in claim 14, wherein the channel tracking algorithm is an algorithm selected from the group comprising a recursive least square tracking algorithm and a least mean square tracking algorithm.

* * * * *